H. W. Thornburg,
Cattle Pump.

N° 65,026.  Patented May 21, 1867.

Witnesses:
F. Lehmann
Robt. Green

Inventor:
H. W. Thornburg
Per
J. H. Alexander & Co.
attys

United States Patent Office.

HARRIS W. THORNBURG, OF MORRISTOWN, INDIANA, ASSIGNOR TO C. W. MORRISON, OF THE SAME PLACE.

*Letters Patent No. 65,026, dated May 21, 1867.*

IMPROVEMENT IN CATTLE-PUMPS.

*The Schedule referred to in these Letters Patent and making part of the same.*

TO ALL WHOM IT MAY CONCERN:

Be it known that I, HARRIS W. THORNBURG, of Morristown, Indiana, have invented certain new and useful improvements in Cattle-Pumps; and I hereby declare that the following is a true, full, and exact description of the same, reference being had to the accompanying drawings and to the letters of reference marked thereon. In the annexed drawings, which make a part of this specification—

Figure 1:
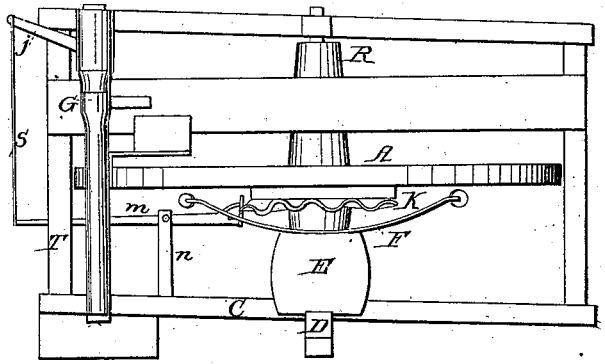
Figure 1 represents a side view of my cattle-pump.
Figure 2:
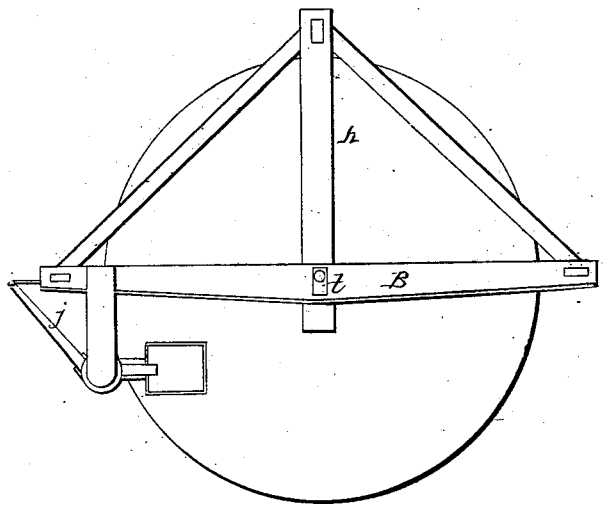
Figure 2 is a plan view of the same.
Figure 3:
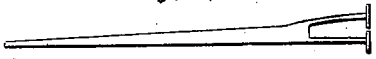

The letter A, in figs. 1 and 2, represents the platform of a common tread-wheel. R is the shaft in the centre of said platform, the gudgeon at the top of which is allowed to play laterally in a slot cut in the head-block B. C designates the sill upon which the lower end of shaft plays. The sill C is intersected by another sill D, on one end of which is fastened the block E. The said block is intended to support the spring F, the concave side of the spring being placed upward. Each end of spring F is furnished with a friction-roller, g, which is pivoted in a slot made to receive it. The object of spring F and friction-roller g will be hereinafter explained. On the shaft R, and immediately under platform A, is placed the cam K, which at its periphery plays between two friction-rollers on the end of lever m. The lever m has its fulcrum in upright n, and its long arm passes through a slot in post T. G represents a pump-stock placed near the circumference of platform A and near post T. The end of the long arm of lever m is connected to pump-handle j by the rod s. Under the spout of the pump is placed the trough to receive the water. Animals wishing to drink can only ascend the wheel on the side where the water is to be procured, the opposite side being fenced in. When any animal ascends the platform to satisfy thirst, his weight will set the platform in motion, and the cam K, acting between the pulleys on the short arm of lever m, will give a vertical reciprocating movement to the long arm of lever m, and this motion will be imparted to pump-handle j by means of connecting-rod s. It will be seen that from the slight inclination of the platform A, its motion will be slow under the tread of a small animal when walking on it, and that when an animal of large size is upon it, the additional weight will press the circumference of the wheel upon the friction-rollers g, thereby impeding the motion of the platform and equalizing the motion produced by the tread of a heavy animal with that produced by an animal of diminished size and weight.

Having thus described my invention, what I claim, and desire to secure by Letters Patent, is—

1. The circular platform A, in combination with shaft R, when said shaft is arranged by means of slot t, that the pumping apparatus will adapt itself to the weight of the animal, substantially as set forth.

2. Spring F, provided with friction-rollers, in combination with the tilting platform A, as and for the purpose described.

3. The circular or tilting platform A, shaft R, slotted head-block B, cam-wheel K, and lever m, all arranged substantially as and for the purpose specified.

In testimony whereof I set my signature in presence of two witnesses.

HARRIS W. THORNBURG.

Witnesses:
O. F. FITCH,
WM. L. TALBOTT.